April 11, 1967    D. D. MAXSON ET AL    3,313,113
CONTROL FOR OPENING NOZZLES OF ROCKET ENGINES
Filed May 18, 1960    2 Sheets-Sheet 1

INVENTORS.
DONALD D. MAXSON
ANTHONY W. DATTILO
BY
Curtis, Morris & Safford
ATTORNEYS

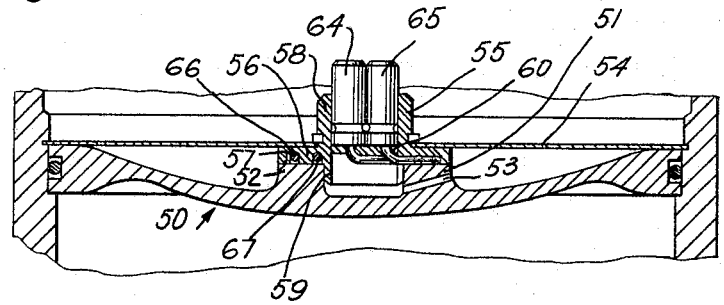
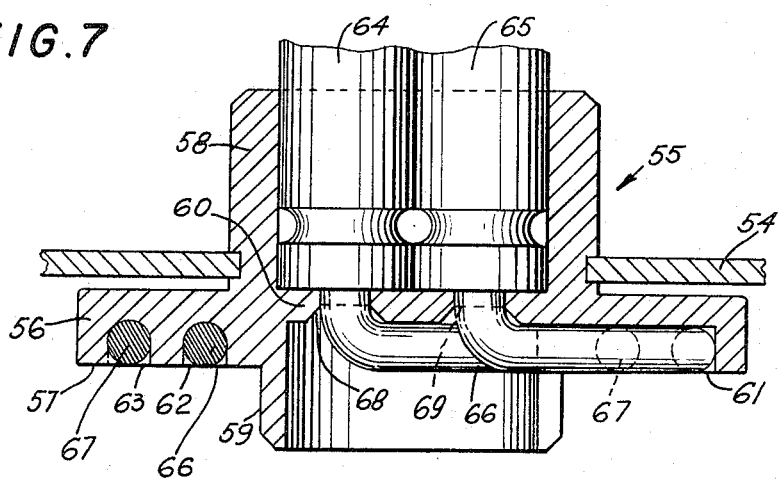
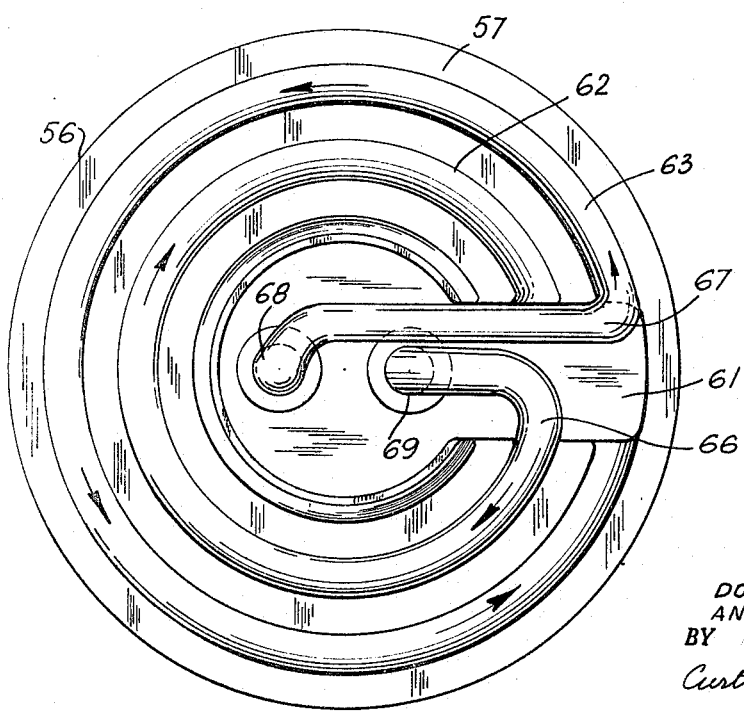

United States Patent Office 3,313,113
Patented Apr. 11, 1967

3,313,113
CONTROL FOR OPENING NOZZLES OF ROCKET ENGINES
Donald D. Maxson, Yardley, and Anthony W. Dattilo, Philadelphia, Pa., assignors, by mesne assignments, to the United States of America as represented by the Secretary of the Air Force
Filed May 18, 1960, Ser. No. 29,928
10 Claims. (Cl. 60—254)

The present invention relates to a release device particularly adapted for use on rocket engines to control thrust. While the invention may have other applications for the instantaneous release of a force, it is shown and described as applied to rocket engines.

Rocket engines comprise a casing containing a combustible fuel and having a nozzle at one end. When the fuel burns, it produces products of combustion in the casing at high pressure which escape through the nozzle at a high velocity and produce a thrust to propel the rocket.

It is desirable in many instances to be able to terminate the forward thrust on a rocket or stage of a rocket while in flight. For example, it may be desirable to produce a fixed terminal velocity of the rocket to control its path in a trajectory or in space, or to produce a fixed terminal velocity of a particular stage of a staged rocket, or to produce a reverse thrust on a stage of a rocket casing at the end of its burning cycle to separate the stages. To this end, the rocket casing or a staged section of the casing is provided with an auxiliary nozzle or nozzles for producing a thrust opposing the thrust of the main nozzle to cancel, or reverse or otherwise change the direction of the resultant thrust acting on the rocket.

One of the objects of the present invention is to provide an auxiliary nozzle on a rocket engine to control thrust which is normally closed by a releasable closure plug and opened when the closure plug is released.

Another object is to provide an improved closure plug and releasing mechanism which are blown clear of the nozzle when released to open the nozzle.

Another object is to provide a deformable snap plate for locking a closure plug in a pressure vessel which is deformed by a controlled explosive charge to release the closure plug.

Still another object is to provide a closure plug and releasing mechanism which is of simple and compact construction, economical to manufacture and one which is reliable in operation to open an auxiliary nozzle of a jet engine.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims.

In the drawings:

FIGURE 6 is a sectional view similar to FIGURE 2 illustrating a modified construction in which the explosive charge acts between adjacent parallel faces on the plug and locking plate;

FIGURE 7 is an enlarged sectional view of the force responsive fitting at the axis of the flexible locking plate and showing the explosive charge and detonators mounted thereon; and FIGURE 8 is a bottom plan view of the fitting and showing the explosive charge as comprising separate sections of mild detonating fuse extending in opposite directions in circular grooves in the face of the fitting.

Figure 1:
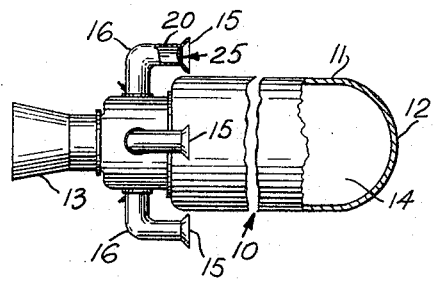
FIGURE 1 is a part sectional view of a rocket engine having auxiliary jet nozzles to which the closure plug and releasing mechanism of the present invention are applied.

Referring to FIGURE 1 of the drawings, the invention is shown applied to a rocket 10 having a cylindrical casing 11 closed at its forward end 12 and having a main propulsion nozzle 13 at its rearward end. The casing 11 itself may constitute a combustion chamber 14, especially when solid fuels are used, or may contain a separate chamber containing fluid under pressure, or a separate combustion chamber where fuel is burned. The burning of the fuel in the combustion chamber 14 produces products of combustion at a high pressure which, as they escape through the main propulsion nozzle 13 at high velocity, produce a forward thrust on the rocket 10.

The casing 11 of the rocket 10 also is provided with auxiliary nozzles 15 for producing a cancelling or reversing thrust on the rocket 10. In the illustrated embodiment the auxiliary nozzles 15 are shown located adjacent to but forwardly of the main nozzle 13. Four of such nozzles 15 are illustrated in FIGURE 1 and each is located at the end of right angular tube 16 projecting radially and then forwardly with the nozzle facing in the opposite direction from the main nozzle 13. In the illustrated embodiment, the tubes 16 open into and communicate with the combustion chamber 14 of the rocket 10. It is to be understood, however, that the auxiliary nozzles 15 may be located at other positions on the rocket casing and connected directly to the combustion chamber 14, connected to a separate chamber containing a fluid under pressure, or connected to a chamber containing a separate supply of fuel. For example, one or more of the auxiliary nozzles 15 may be located at the forward end of the rocket motor casing 11 either at the exterior or at the interior and extending to an opening in the casing. As shown in the enlarged views in FIGURES 2 to 5, each auxiliary nozzle 15 comprises a cylindrical wall 18 connected to the source of fluid under pressure, such as the combustion chamber 14 of the rocket 10, and a diverging conical wall 19 forming a throat portion 20 therebetween. Thus, the nozzle 15 forms an orifice 21 through which a pressure fluid may flow in a jet.

In accordance with the present invention, each of the auxiliary nozzles is normally closed by a closure plug and a locking mechanism which are adapted to blow clear of the nozzle when released. The locking mechanism projects into locking engagement with the wall of the auxiliary nozzle and is deformed to withdraw its edges from engagement with the wall when a controlled explosive charge is ignited. In the specific embodiment, the locking member is in the form of a flexible snap plate which is normally held flat and flexed to a curved contour to withdraw its edges from locking engagement with the wall of the auxiliary nozzle.

Figure 2:
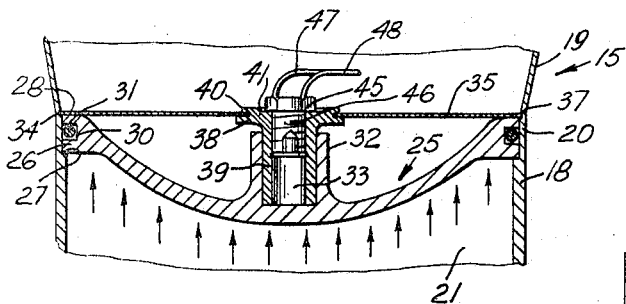
FIGURE 2 is an enlarged sectional view through one of the auxiliary jet nozzles and showing the closure plug locked in position therein.

As shown in FIGURE 2, the closure plug 25 for closing orifice 21 in auxiliary nozzle 15 is of a generally spherical shape with an annular rim 26 adjacent the periphery of the cylindrical wall 18 of the nozzle. The wall 18 is recessed to form an annular shoulder 27 on which the rim 26 of plug 25 seats and the rim provides an annular shoulder 28 at the opposite side of the plug adjacent the wall. Rim 26 of closure plug 25 is provided with an annular recess 30 in which a gasket 31 is held to seal the joint between the rim and cylindrical wall 18 of the nozzle. A cylindrical boss 32 projects from the concaved side of the closure plug 25 at its axis and forms a chamber 33 below the rim for a purpose as will later appear.

Figure 3:
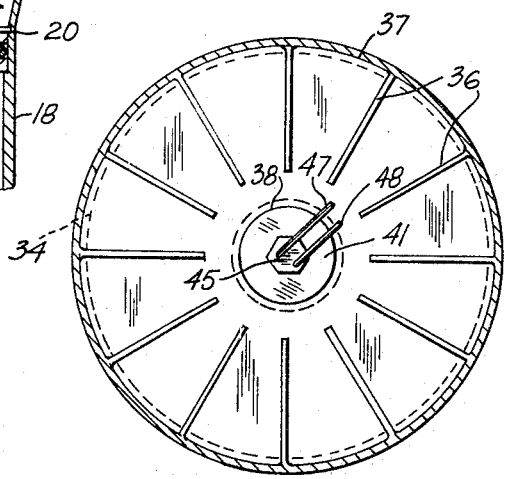
FIGURE 3 is a sectional plan view showing the construction of the snap plate for locking a closure plug in an auxiliary nozzle.
Figure 5:
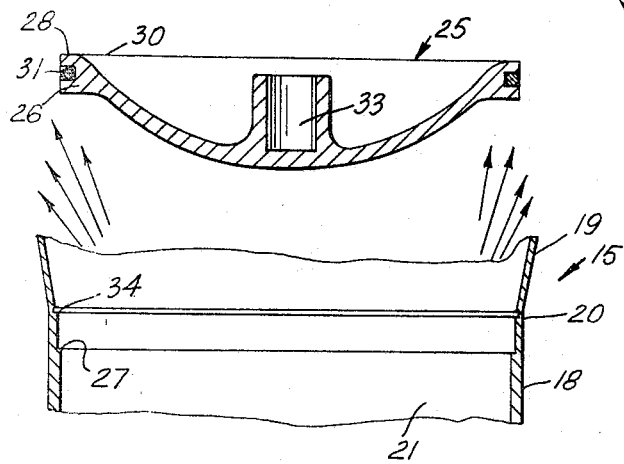
FIGURE 5 is a view similar to FIGURE 4 showing the closure plug being blown outwardly from the nozzle.

The closure plug 25 is locked in the nozzle 15 to close the orifice 21 therein by a locking member 35 having its edges projecting radially into a peripheral groove 34 in the wall 18 of the auxiliary nozzle 15 at the throat 20. As shown in FIGURES 2 and 3, the locking member 35 is in the form of an annular disc of a resilient material, such as spring steel. Disc 35 has slots 36 extending radially inward from its outer periphery 37 to a point short of its inner periphery 38 for increasing the flexibility of the disc. The locking disc 35 overlies the closure plug 25 with its edge at the outer periphery 37 projecting into the groove 34 in the wall 18 to hold the closure plug from movement outwardly of the auxiliary nozzle 15. It will be noted that the locking disc 35 overlies the annular shoulder 28 on the closure plug 25 closely adjacent its peripheral locking edge so that the plug produces only a small component of force tending to flex the disc.

A depending projection or piston sleeve 39 is mounted on the inner edge of the annular locking disc 35 and projects into the chamber 33 formed by the cylindrical boss 32 on the closure plug 25. As illustrated, the edge of disc 35 adjacent its inner periphery 38 extends into an annular groove 40 in a rim 41 projecting from the end of the piston sleeve 39 and the rim is swaged to lock the disc to the rim. Piston sleeve 39 has a close or press fit with the wall of cylindrical boss 32 to hold the center of the locking disc in the flat position illustrated in FIGURE 2. Thus, any axial force applied to locking disc 35 adjacent its outer periphery 37 tending to flex the disc is opposed by the frictional engagement of the sleeve 39 with the annular boss 32 on the plug.

Figure 4:
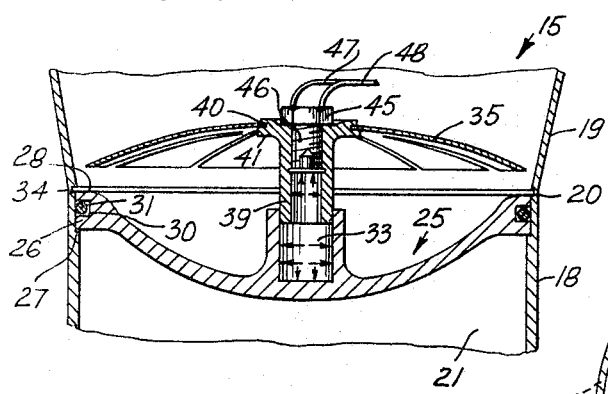
FIGURE 4 is a view similar to FIGURE 2 showing the locking plate flexed by a controlled explosive charge to release the closure plug.

The locking disc 35 is flexed to the unlocking position illustrated in FIGURE 4 by applying pressure in the chamber 33 between the cylindrical sleeve 39 on the disc and the cylindrical boss 32 on the plug 25. The pressure may be applied by a hydraulic fluid, or the pressure in the combustion chamber 14 or from any other suitable source. In the illustrated embodiment, however, the force is applied by an explosive charge, such as a squib 45. The explosive squib 45 is in the form of a fitting having a screw threaded engagement 46 with the inside wall of the cylindrical sleeve 39 on the locking disc 35 and closes one end of the sleeve. The squib 45 produces a controlled pressure between the center of the locking disc 35 and closure plug 25. Wires 47 and 48 of an ignitor project from the explosive squib 45 to an electric control, not shown. The electrical control for igniting the explosive squib 45 may constitute a time control, a control responsive to the velocity of the rocket 10 or a remote control. One form of the invention having now been described in detail, the mode of operation is next explained.

For purposes of description, let it be assumed that the combustion chamber 14 of rocket 10 contains a solid fuel propellant, the auxiliary nozzles 15 are in communication with the combustion chamber and designed to produce a cancelling thrust equal and opposite the thrust produced by the main propulsion nozzle 13 and that the auxiliary nozzles 15 are to be opened when a predetermined terminal velocity of the rocket 10 is attained. Further, let it be assumed that each of the auxiliary nozzles 15 is closed by a plug 25 as illustrated in FIGURE 2 and locked therein by a locking disc 35.

Upon ignition, the solid fuel in the combustion chamber 14 burns at a rapid rate and produces products of combustion therein at a high pressure. The flow of the high pressure products of combustion through the main nozzle 13 produces a forward thrust force on the rocket 10 greater than the force of gravity. Thus, the rocket is propelled with an acceleration which continually increases the velocity of the rocket. In order to be sure that the rocket will attain the desired velocity, an excess of fuel is supplied. When the rocket 10 has acquired the desired terminal velocity an ignition system is closed to ignite the explosive squib 45 in each of the auxiliary nozzles 15. The force produced by the explosive squib 45 acts between the piston sleeve 39 at the axis of the locking disc 35 and plug 25, respectively. This force propels the piston sleeve 39 relative to the closure plug 25 to separate the parts and flexes the locking disc 35 as shown in FIGURE 4. Such flexing of the locking disc 35 withdraws its peripheral edge 37 from the annular groove 34 in the wall 18 of the nozzle 15 to release the closure plug 25. Due to the seating of the peripheral rim 26 of the closure plug 25 on the annular shoulder 27 of the nozzle 15, the explosive force of the squib 45 moves the piston sleeve 39 only to flex disc 35. As soon as the peripheral edge of the locking disc 35 is withdrawn the pressure of the products of combustion from the combustion chamber 14 blows the closure plug 25 and locking disc from the nozzle 15 to open the orifice 21 therein. In other words, the explosive squib 45 withdraws the locking plate 35 and forces it outwardly with respect to the plug 25 and the plug is blown out of the nozzle by the products of combustion to completely open the nozzle.

The jets of gas flowing from the plurality of auxiliary nozzles 15 then produces a reverse thrust on the rocket 10. As the plurality of nozzles 15 are so designed as to produce a cancelling thrust equal and opposite the thrust produced by the main nozzle 13, there remains no component of thrust to accelerate the rocket 10 so that it will maintain the predetermined terminal velocity desired.

It will be understood that the auxiliary nozzles 15 of the present invention may be used on one or more stages of a multi-stage rocket and the nozzles may be designed to produce a reverse thrust on a particular stage to separate it from the remaining stages between the burn-out of one stage and the ignition of the next stage. It will be further understood that the present invention may be applied to any type of auxiliary nozzle on a rocket for any desired purpose to further augment, cancel or reverse the thrust applied to a rocket.

FIGURES 6 to 8 illustrate a modified construction in which the explosive charge is a mild detonating fuse acting between parallel mating faces on the closure plug and flexible locking plate. As shown in FIGURE 6, the plug 50 is generally similar to plug 25 illustrated in FIGURES 2 to 5, but having a lesser radius of curvature. The cylindrical boss 51 at the axis of the closure plug 50 is of less depth and has a thicker wall to provide an annular face 52 at its outer end. Boss 51 has a hole 53 extending to the bottom of the recess formed by the boss to provide a breathing opening for a purpose as will later appear.

The locking plate 54 is generally the same as the locking plate 35, but has a fitting 55 at its inner periphery of a different construction. Fitting 55 is an integral onepiece structure having a plate section 56 with an annular face 57 which overlies and mates with the face 52 on the closure plug 50 in parallel relation, an annular boss 58 projecting from one side of the plate section to which the inner periphery of the lock disc is attached, an annular boss 59 projecting from the other side of the plate section and extending into the boss 51 of the closure plug with a close fit and a septum wall 60 between the bosses 58 and 59.

The annular face 57 of fitting 55 has a radial recess 61 and annular recesses 62 and 63 extending from the radial recess as shown in FIGURES 7 and 8. The explosive charge comprises detonators 64 and 65 in the annular boss 58 and separate sections 66 and 67 of a mild detonating fuse extending from the detonators through holes 68 and 69 in the septum wall 60, outwardly in the radial recess 61 and then around the annular recesses 62 and 63, respectively. The separate sections of fuse 66 and 67 are shown extending in opposite directions in the annular recesses 62 and 63, which is believed to be advantageous, but the sections may extend in the same direction. Thus, the fuse sections 66 and 67 constitute the explosive charge which acts between parallel mating surfaces on the closure plug 50 and locking plate 54 and each section of fuse when detonated produces a force sufficient to flex and release the locking plate.

The modified construction illustrated in FIGURES 6 to 8 operates in substantially the same way as the form illustrated in FIGURES 1 to 5 to release the locking plate 54, except that the force of the explosive charge is initially confined in the annular recesses 62 and 63 and acts between the parallel mating faces of the closure plug 50 and fitting 55. The force of the explosive charge moves fitting 55 relative to the closure plug 50 and flexes the locking plate 54 to withdraw its outer peripheral edge from locking engagement with the wall of the nozzle. In the modified construction, the boss 59 of the fitting 55 projecting into the recess in the closure plug merely acts as a guide and the hole 53 vents the space between the parts.

It will now be observed that the present invention provides an auxiliary nozzle on a rocket engine to control thrust which is normally closed by a releasable closure plug and opened when the plug is released. It will also be observed that the present invention provides an improved closure plug and releasing mechanism for opening the auxiliary nozzle of a jet engine which are blown clear of the nozzle when released. It also will be observed that the present invention provides a deformable snap plate for locking a closure plug in a pressure vessel which is deformed by a controlled explosive charge to release the closure plug. It will still further be observed that the present invention provides a closure plug releasing mechanism which is of simple and compact contruction, economical to manufacture and one which is reliable in operation to open auxiliary nozzles of a jet engine.

While a single embodiment of the invention is herein illustrated and described, it will be understood that changes may be made in the construction and arrangement of elements without departing from the spirit or scope of the invention. Therefore, without limitation in this respect, the invention is defined by the following claims:

What is claimed is:

1. In a rocket enigne of the type having a casing containing a fluid under pressure with a nozzle at one end, a controlling mechanism comprising at least one auxiliary nozzle on the casing and communicating with the fluid under pressure theirein, said auxiliary nozzle having a peripheral wall with recesses therein at opposite sides, a piston plug for closing the auxiliary nozzle and of a size to closely fit its peripheral wall, a locking member overlying the piston plug and of a length greater than the diameter of the plug with its ends projecting into the recesses in the opposite sides of the wall, the edges of the piston plug engaging the locking member adjacent the wall to produce only a small component of force tending to deform the member, releasing means between the piston plug and locking member for producing a maximum force on the member axially of the nozzle to physically deform the member to reduce its radial dimension and thereby withdraw its ends from the recesses in the wall of the nozzle to release the piston plug whereby to adapt the plug and locking member to be blown from the auxiliary nozzle by the fluid under pressure in the rocket engine without fracturing any parts.

2. A control mechanism for a rocket in accordance with claim 1 in which the piston plug has an annular shoulder adjacent the wall of the nozzle, and the locking member is a flexible disc.

3. A control mechanism for a rocket in accordance with claim 2 in which the flexible disc has radial slots extending inwardly from its outer periphery.

4. A control mechanism in accordance with claim 3 in which the means between the piston plug and locking member is a piston on the locking member, and the mechanism for propelling the piston is a cylinder on the plug into which the piston extends, and means for producing an expansive force between the piston and cylinder for propelling the piston relative to the closure plug.

5. A control mechanism for a rocket in accordance with claim 4 in which the means for producing an expansive force between the cylinder and piston is an explosive squib.

6. A control mechanism for a rocket in accordance with claim 5 in which the peripheral wall of the auxiliary nozzle has an annular shoulder formed thereon, said plug seating on said annular shoulder on the wall, an annular recess in the periphery of the plug, a gasket in said recess and engaging the peripheral wall forming the nozzle to seal the joint therebetween, and the peripheral groove in the wall being positioned adjacent the edge of the shoulder on the closure plug.

7. A control mechanism for a rocket in accordance with claim 1 in which the means between the locking member and piston plug have parallel mating faces overlying each other, an annular groove in one of the faces, and an explosive charge comprising a mild detonating fuse in the annular groove.

8. A control mechanism in accordance with claim 7 in which the mating face on the plunger has a radial groove and a pair of concentric annular grooves extending from the radial groove, and a section of the explosive fuse in each of the annular grooves.

9. A control for instantaneously releasing an imperforate closure from an orifice in an apparatus which applies a force on one side of a closure comprising a peripheral wall for the orifice having recesses therein at opposite sides, a piston plug forming the closure for closing the orifice and of a size to closely fit its peripheral wall, a locking member overlying the piston plug and of a length greater than the width of the piston plug with its ends projecting into the recesses in the opposite sides of the wall, the edges of the piston plug engaging the locking member adjacent the wall to produce only a small component of force tending to deform the member, means between the piston plug and locking member for producing a maximum force on the member axially of the orifice to physically deform the member and reduce its radial dimension and thereby withdraw its ends from the recesses in the wall surrounding the orifice to release the piston plug whereby to adapt the plug and locking member to be blown from the orifice by the fluid under pressure in the apparatus without fracturing any parts.

10. A rocket engine of the type having a casing containing a fluid under pressure with a nozzle at one end, a controlling mechanism comprising at least one auxiliary nozzle on the casing and communicating with the fluid under pressure therein, said auxiliary nozzle having a peripheral wall with recess means therein at opposite sides, a piston plug for closing the auxiliary nozzle and of a size to closely fit its peripheral wall, a locking member overlying the piston plug and of a length greater than the diameter of the plug with its ends projecting into said recess means in the opposite sides of the wall, the edges of the piston plug engaging the locking member adjacent the wall to produce only a small component of force tending to deform the member, releasing means between the piston plug and locking member for producing a maximum force on the member axially of the nozzle to physically deform the member to reduce its radial dimension and thereby withdraw its ends from the recesses in the wall of the nozzle to release the piston plug whereby to adapt the plug and locking member to be blown from the auxiliary nozzle by the fluid under pressure in the rocket engine without fracturing any parts.

References Cited by the Examiner

UNITED STATES PATENTS

| | | | |
|---|---|---|---|
| 2,627,160 | 2/1953 | MacDonald | 60—35.6 |
| 2,850,976 | 9/1958 | Seifert | 102—49 |
| 2,933,889 | 4/1960 | Tolkmitt | 60—35.6 |
| 2,943,445 | 7/1960 | Ritterskamp et al. | 60—39.09 |
| 2,952,972 | 9/1960 | Kimmel et al. | 60—35.6 |
| 2,995,091 | 8/1961 | Haymes et al. | 60—35.6 |
| 3,135,416 | 6/1964 | Royer | 220—47 |

MARK NEWMAN, *Primary Examiner.*

SAMUEL LEVINE, J. E. WEST, *Examiners.*

E. L. LARCHER, L. J. CLARKE, C. R. CROYLE,
*Assistant Examiners.*